(12) United States Patent
Hsu

(10) Patent No.: US 9,392,180 B2
(45) Date of Patent: Jul. 12, 2016

(54) PARTIAL LENS SHADING COMPENSATION METHOD

(71) Applicant: NOVATEK MICROELECTRONICS CORP., Hsinchu (TW)

(72) Inventor: Wei Hsu, Taoyuan County (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 127 days.

(21) Appl. No.: 13/661,399

(22) Filed: Oct. 26, 2012

(65) Prior Publication Data

US 2013/0258135 A1   Oct. 3, 2013

(30) Foreign Application Priority Data

Mar. 29, 2012 (TW) ............................. 101111193 A

(51) Int. Cl.
*H04N 5/235* (2006.01)
*H04N 5/357* (2011.01)

(52) U.S. Cl.
CPC ............ *H04N 5/2351* (2013.01); *H04N 5/3572* (2013.01)

(58) Field of Classification Search
CPC ..... H04N 5/235; H04N 5/238; H04N 5/3572; H04N 5/217; H04N 5/228; H04N 9/045; H04N 1/401
USPC ..................... 348/229.1, 251, 222.1
See application file for complete search history.

(56) References Cited

U.S. PATENT DOCUMENTS

| | | | |
|---|---|---|---|
| 3,971,065 A | 7/1976 | Bayer | |
| 6,999,116 B1 * | 2/2006 | Hieda | H04N 9/045 348/222.1 |
| 2002/0126209 A1 * | 9/2002 | Yamada | H04N 3/1587 348/219.1 |
| 2007/0019105 A1 * | 1/2007 | Yanagidate | 348/362 |
| 2007/0242897 A1 * | 10/2007 | Bushell et al. | 382/274 |
| 2013/0002912 A1 * | 1/2013 | Park et al. | 348/251 |

* cited by examiner

*Primary Examiner* — Antoinette Spinks
(74) *Attorney, Agent, or Firm* — Rabin & Berdo, P.C.

(57) ABSTRACT

Method and apparatus for partial lens shading compensation are provided. An image area is divided, from the inside towards the outside of the image area, into several partial areas centered on an optical center of the image. When a target pixel is identified as being located in one of the partial areas, a corresponding compensation gain is determined according to the position of the target pixel with reference to the optical center. Another compensation gain is determined according to the position of the target pixel with reference to the optical center. A mixed compensation value is determined according to the compensation gains, so as to compensate the target pixel.

20 Claims, 10 Drawing Sheets

PARTIAL LENS SHADING COMPENSATION METHOD

This application claims the benefit of Taiwan application Serial No. 101111193, filed Mar. 29, 2012, the subject matter of which is incorporated herein by reference.

BACKGROUND OF THE DISCLOSURE

1. Field of the Disclosure

The disclosure relates in general to a partial lens shading compensation method.

2. Description of the Related Art

Image sensors are usually implemented by an array of photodiodes, or by so-called pixels. The pixels itself, instead of retrieving colors from light beam, convert broadband spectrum photons into electrons. In order for a single image sensor to record color images, a color filter is used to filter the incident light so that different pixels can detect different colors. Different color filters have different arrangements on the image sensors, and the Bayer arrangement of color filters is widely used in various applications. For a Bayer filter, there is a filter pattern which is 50% green, 25% red and 25% blue. For retrieving color information, red, green, and blue color filters have a particular arrangement on the image sensors for forming a repeating unit. For a Bayer filter, there is a repeating unit of 2×2 grid.

However, due to the geometric arrangement of the pixel array, color filters of different colors correspond to different shading functions, thus causing current portable image sensors to generate image distortion.

SUMMARY OF THE DISCLOSURE

The disclosure is directed to a partial lens shading compensation method which can be used in an image processing apparatus to perform lens shading correction on images and improve color shift.

According to an aspect of the present disclosure, a partial lens shading compensation method is provided. The partial lens shading compensation method includes a number of steps. An image area is divided, from the inside towards the outside of the image area, into a number of partial areas. The partial areas are centered on an optical center of the image area. The partial areas include a first partial area, a second partial area, and a third partial area. When a target pixel is identified as being located in the first partial area, a first compensation gain is determined according to the position of the target pixel with reference to the optical center. When the target pixel is identified as being located in the second partial area determining, a second compensation gain is determined according to the position of the target pixel with reference to the optical center. When the target pixel is identified as being located in the third partial area, a third compensation gain is determined according to the position of the target pixel with reference to the optical center. A fourth compensation gain is determined according to the position of the target pixel with reference to the optical center. A mixed compensation value is determined according to the first compensation gain, the second compensation gain, the third compensation gain, and the fourth compensation gain, so as to compensate the target pixel.

According to another aspect of the present disclosure, a partial lens shading compensation method is provided. The partial lens shading compensation method includes a number of steps. An image area is divided, from the inside towards the outside of the image area, into a number of partial areas. The partial areas are centered on an optical center of the image area. For each of the partial areas, a target pixel is identified as being located inside or outside of that partial area. According to the identification result, a corresponding compensation gain of that partial area for the target pixel is determined from the position of the target pixel with reference to the optical center. Another compensation gain for the target pixel is determined according to the position of the target pixel with reference to the optical center. A mixed compensation value is determined according to the compensation gains, so as to compensate the target pixel.

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

According to the disclosed embodiments of the partial lens shading compensation method, an image area is divided into a number of partial areas, and is compensated by using different compensation gains for lens shading effect. In this way, the method can be, for example, used in an image processing apparatus to perform lens shading correction on images and improve color shift.

Figure 1:
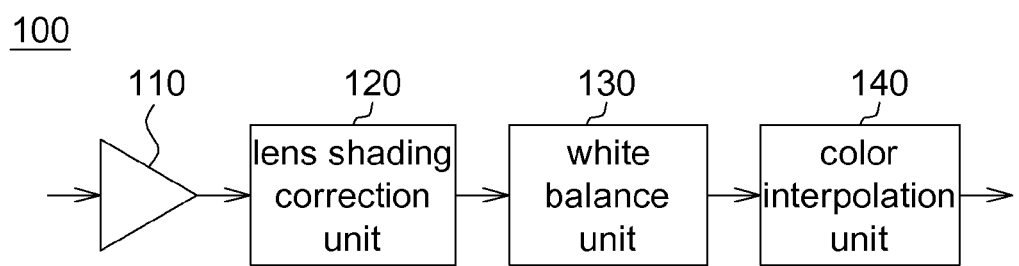
FIG. 1 is a block diagram showing an image processing apparatus according to an exemplary embodiment.

FIG. 1 is a block diagram showing an image processing apparatus according to an exemplary embodiment. The image processing apparatus 100 includes an analog to digital converter 110 and a lens shading correction unit 120. The analog to digital converter 110 receives a number of pixel voltages of an image area from a pixel array, and converts the pixel voltages into a number of digital pixel data. The lens shading correction unit 120 obtains a mixed compensation value according to the position of a target pixel, so as to compensate the target pixel. A plurality of partial areas are centered on an optical center of the image area. Besides, the image processing apparatus 100 can further include a white balance unit 130 and a color interpolation unit 140. The color interpolation unit 140 performs interpolation on image data output from the white balance unit 130, thus obtaining image data based on tri-primary color such as RGB.

Figure 2:
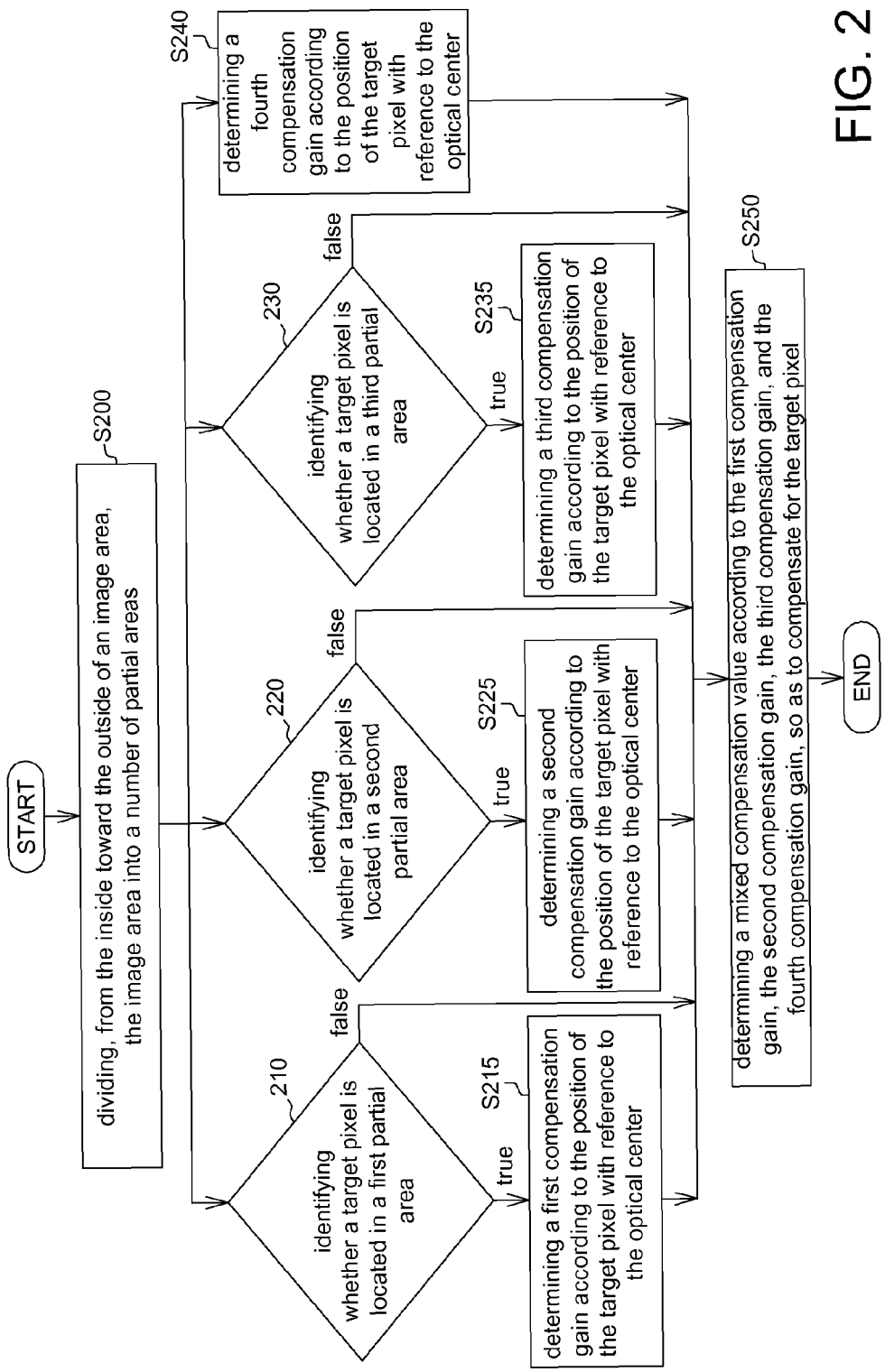
FIG. 2 is a flow chart showing a partial lens shading compensation method according to an exemplary embodiment.
Figure 3:
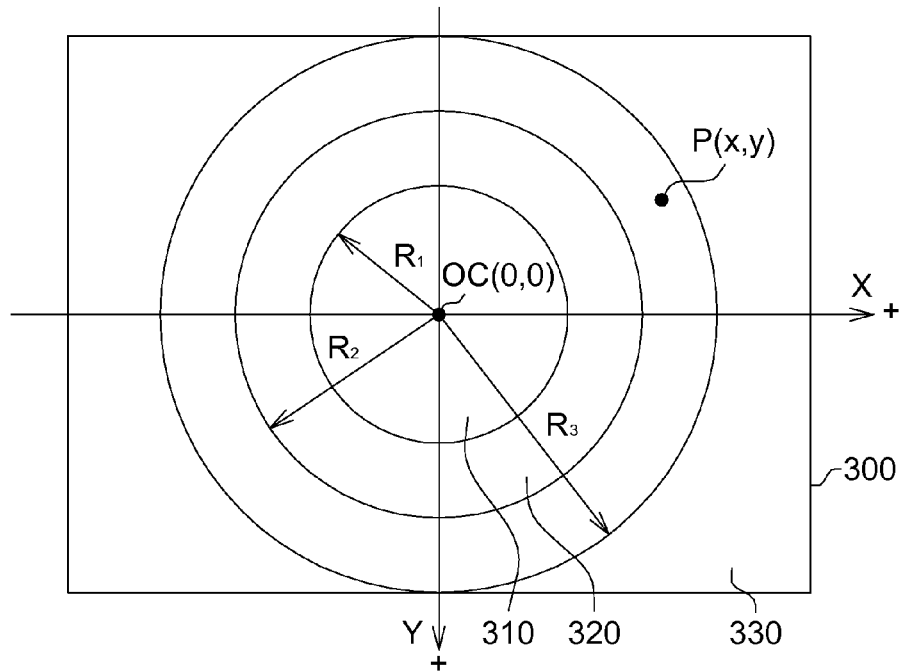
FIG. 3 is a schematic diagram showing an image area according to an exemplary embodiment.

FIG. 2 is a flow chart showing a partial lens shading compensation method according to an exemplary embodiment. The partial lens shading compensation method can be, for example, used in the lens shading correction unit of FIG. 1. In step S200, an image area is divided into a number of partial areas from the inside toward the outside of the image area. FIG. 3 is a schematic diagram showing an image area according to an exemplary embodiment. In FIG. 3, the lens shading correction unit 120 divides an image 300 into a number of partial areas. The partial areas are centered at an optical center OC of the image area 300. The partial areas include a first partial area 310, a second partial area 320, and a third partial area 330. The optical center OC of the image area 300 is regarded as an origin of a coordinate system such as a plane. In FIG. 3, the partial areas 310 to 330 are exemplified as a number of concentric circles, but this disclosure is not limited thereto. In other examples, the partial areas 310 to 330 can be a number of concentric ellipses. As can be seen from FIG. 3, the borders of the partial area 310 to 330 can be defined by a first curvature radius $R_1$, a second curvature radius $R_2$, and a third curvature radius $R_3$, respectively. In the example, a relative relationship is $R_1 < R_2 < R_3$. However, in other examples, there are other relative relationships such as $R_1 < R_3 < R_2$. Besides, it is exemplified in the embodiment of FIG. 3 that there are three partial areas. The embodiment, however, is regarded as an example for illustration, and there are other embodiments with different numbers of partial areas.

As to how to obtain the curvature radii $R_1$ to $R_3$, an example is provided as follows. The first to the third curvature radii $R_1$ to $R_3$ can be obtained according to the difference among different color shading curves of a corresponding lens. Besides, after the first to the third curvature radii $R_1$ to $R_3$ are obtained, a first compensation function, a second compensation function, and a third compensation function can be obtained. Further illustration will be provided below for showing that the compensation functions are used to obtain a mixed compensation value according to the position of the target pixel, so as to correct the difference among different color shading curves.

In some embodiments, the first to the third compensation functions can be polynomial equations, and the polynomial equations have a number of inflectional points which are corresponding to the first to the third curvature radii $R_1$ to $R_3$. As is aforementioned, the borders of the partial areas can be defined by the first to the third curvature radii $R_1$ to $R_3$, which means that the inflectional points are located at the borders of the first to the third partial areas. As to the description below, in the steps of determining the first to the third compensation gains according to the position of the target pixel with reference to the optical center, the first to the third compensation gains are obtained by using the first to the third compensation functions. Further, the first to the third compensation functions can be based on obtaining the mixed compensation value.

In step S210, the lens shading correction unit 120 identifies whether a target pixel P is located in the first partial area 310. For mathematical illustration, it is assumed that the position of the target pixel P with reference to the optical center OC can be expressed by a first coordinate x and a second coordinate y. Then, it is determined whether $SquarePos = a_0 x^2 + a_1 y^2 \leq R_1^2$ is satisfied or not, where $a_0$ and $a_1$ indicate a first coordinate parameter and a second coordinate parameter, respectively, and $R_1$ indicates a first curvature radius parameter. In some embodiments, there are examples where $a_0$ is equal to $a_1$, meaning that the first partial area 310 is a circle. In other embodiments, there are examples where $a_0$ is not equal to $a_1$, meaning that the first partial area 310 is an eclipse.

When the determination result is false is step S210, a first compensation gain for the target pixel P is assigned to be zero. When the determination result is true in step S210, the method proceeds to step S215. In step S215, the lens shading correction unit 120 depends on the position of the target pixel P with respect to the optical center OC, and uses the first compensation function defined by the first curvature radius to determine the first compensation gain for the target P. Further illustration is as follows. The first compensation function can be expressed as an equation (1) below:

$$\text{Com\_Gain}_1 = \text{Gain}_1 \times (|\text{SquarePos} - R_1^2|)^{N_1} \qquad \text{eq. (1)}$$

where $\text{Com\_Gain}_1$ indicates the first compensation gain to be obtained, $\text{Gain}_1$ indicates a first gain parameter, and $N_1$ indicates a first polynomial degree parameter.

Figure 4A:
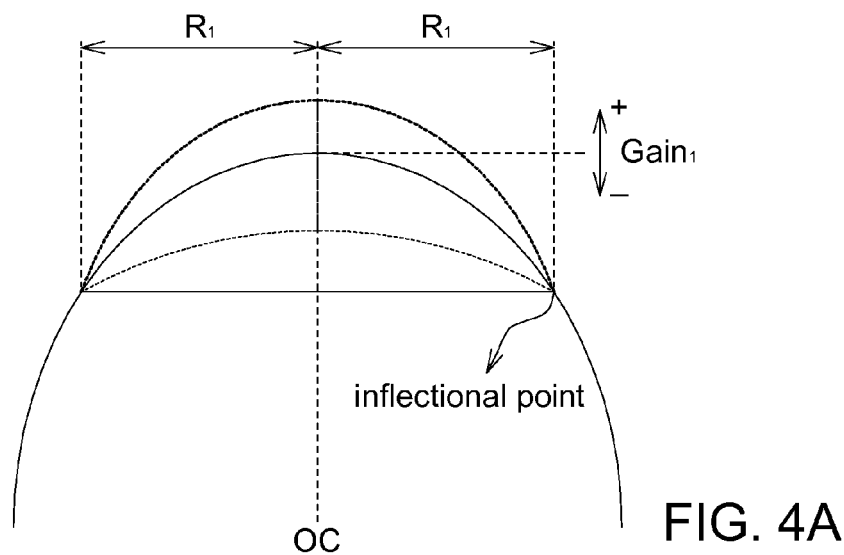
FIG. 4A is a schematic diagram showing lens shading compensation for a first partial area according to an exemplary embodiment.
Figure 4B:
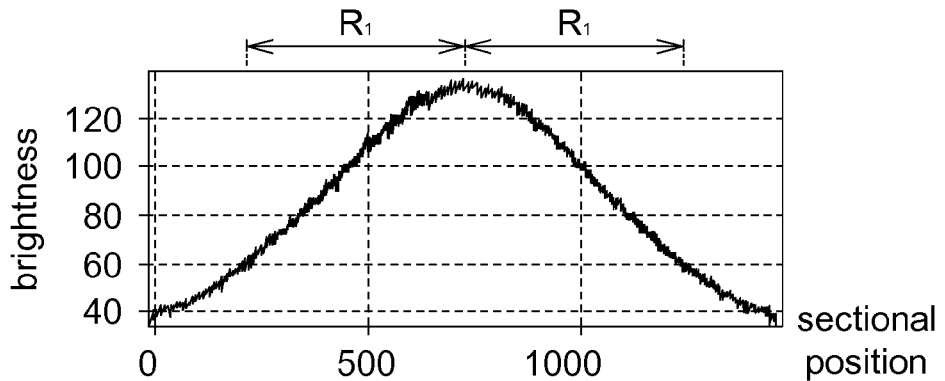
FIGS. 4B to 4D are schematic diagrams showing an example for a left-up to right-down sectional view of the image area according to an exemplary embodiment.
Figure 4C:
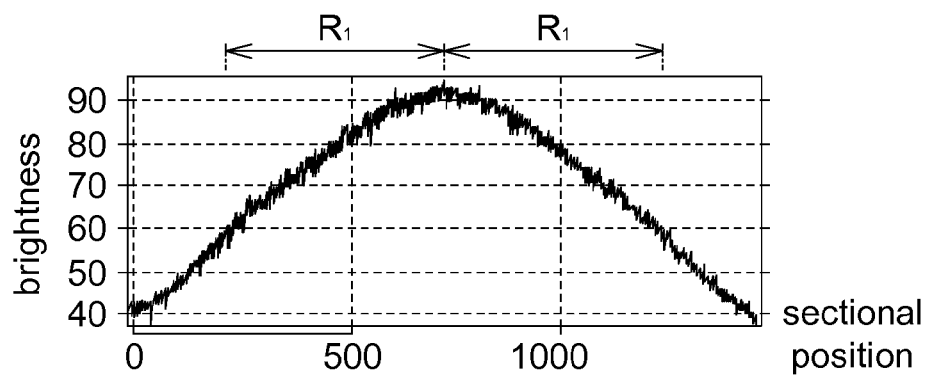
Figure 4D:
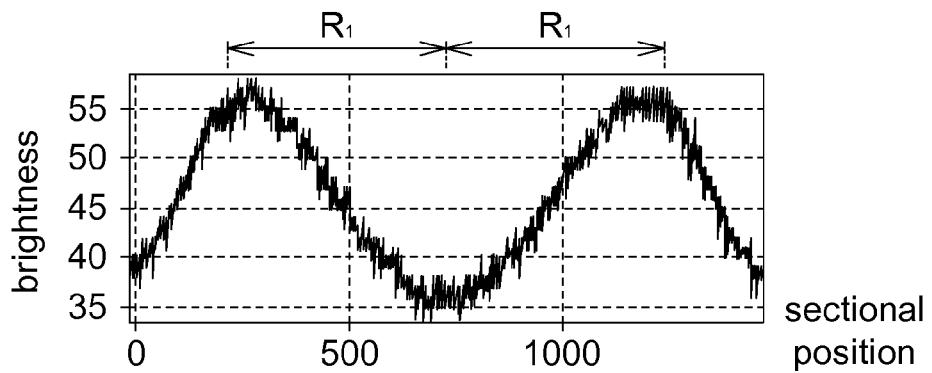

For example, within the first partial area 310, an absolute value of the first compensation gain $\text{Com\_Gain}_1$ can be preferably set to monotonically vary or oscillate towards border of the first partial area 310 at which it becomes substantially zero. FIG. 4A is a schematic diagram showing lens shading compensation for a first partial area according to an exemplary embodiment. In the embodiment, equation (1) is used to adjust the first gain parameter $\text{Gain}_1$, and the first compensation gain $\text{Com\_Gain}_1$ is used to perform color shading correction on the pixels in the first partial area 310, so as to improve color shift. FIGS. 4B to 4D are schematic diagrams showing an example for a left-up to right-down sectional view of the image area according to an exemplary embodiment. As can be seen from FIGS. 4B to 4D, the brightness of the pixels in the first partial area 310 is adjusted in correspondence to the change of the first gain parameter $\text{Gain}_1$. But the brightness of the pixels at the borders $R_1$ of the first partial area 310 is not adjusted and kept a constant such as 60 in this example.

In step S220, the lens shading correction unit 120 identifies whether a target pixel P is located in the second partial area 320. For mathematical illustration, it is assumed that the position of the target pixel P with reference to the optical center OC can be expressed by a first coordinate x and a second coordinate y. Then, it is determined whether $SquarePos = a_0 x^2 + a_1 y^2 \leq R_2^2$ is satisfied or not, where $a_0$ and $a_1$ indicate a first coordinate parameter and a second coordinate parameter, respectively, and $R_2$ indicates a second curvature radius parameter. In some embodiments, there are examples where $a_0$ is equal to $a_1$, meaning that the second partial area 320 is a circle. In other embodiments, there are examples where $a_0$ is not equal to $a_1$, meaning that the second partial area 320 is an eclipse.

When the determination result is false is step S220, a second compensation gain for the target pixel P is assigned to be zero. When the determination result is true is step S220, the method proceeds to step S225. In step S225, the lens shading correction unit 120 depends on the position of the target pixel P with respect to the optical center OC, and uses the second compensation function defined by the second curvature radius to determine the second compensation gain for the target P. Further illustration is as follows. The second compensation function can be expressed as an equation (2) below:

$$\text{Com\_Gain}_2 = \text{Gain}_2 \times (|\text{SquarePos} - R_2^2|)^{N_2} / \text{Factor} \times \text{SquarePos} \quad \text{eq. (2)}$$

where Com_Gain$_2$ indicates the second compensation gain to be obtained, Gain$_2$ indicates a second gain parameter, N$_2$ indicates a second polynomial degree parameter, and Factor is a control factor.

Figure 5A:
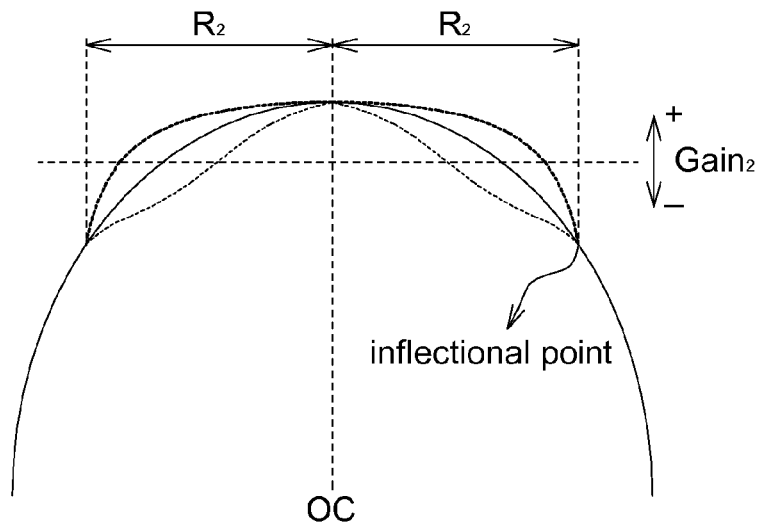
FIG. 5A is a schematic diagram showing lens shading compensation for a second partial area according to an exemplary embodiment.
Figure 5B:
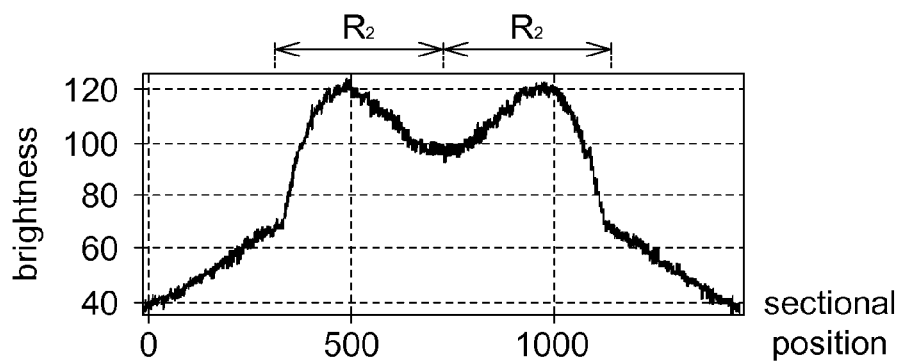
FIGS. 5B to 5D are schematic diagrams showing another example for a left-up to right-down sectional view of the image area according to an exemplary embodiment.
Figure 5C:
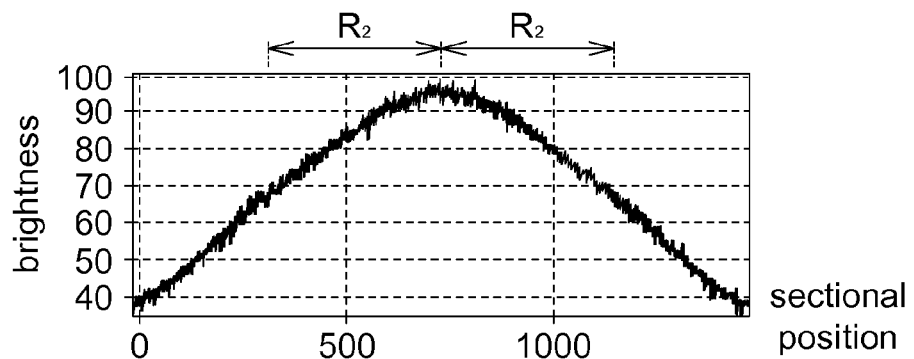
Figure 5D:
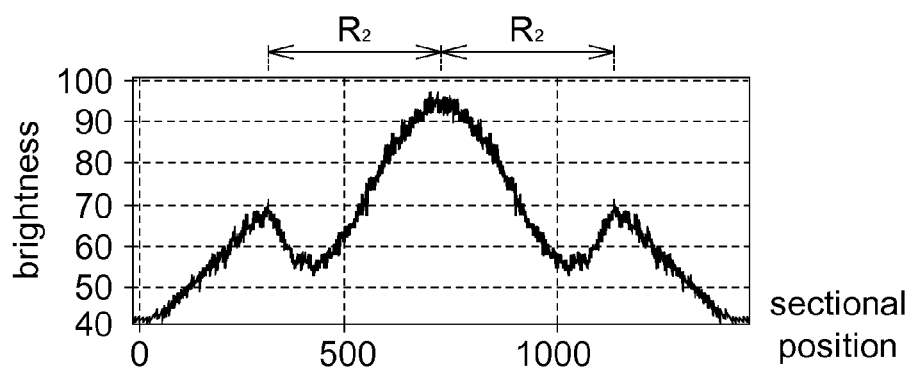

For example, within the second partial area 320, an absolute value of the second compensation gain Com_Gain$_2$ can be preferably set to monotonically vary or oscillate towards the border of the second partial area 320 at which it becomes substantially zero. FIG. 5A is a schematic diagram showing lens shading compensation for a second partial area according to an exemplary embodiment. In the embodiment, equation (2) is used to adjust the second gain parameter Gain$_2$, and the second compensation gain Com_Gain$_2$ is used to perform color shading correction on the pixels in the second partial area 320, so as to improve color shift. FIGS. 5B to 5D are schematic diagrams showing another example for a left-up to right-down sectional view of the image area according to an exemplary embodiment. As can be seen from FIGS. 5B to 5D, the brightness of the pixels in the second partial area 320 is adjusted in correspondence to the change of the second gain parameter Gain$_2$. But, the brightness of the pixels at the borders R$_2$ of the second partial area 320 is not adjusted and kept constant such as 70 in this example.

In step S230, the lens shading correction unit 120 identifies whether a target pixel P is located in the third partial area 330. For mathematical illustration, it is assumed that the position of the target pixel P with reference to the optical center OC can be expressed by a first coordinate x and a second coordinate y. Then, it is determined whether $\text{SquarePos} = a_0 x^2 + a_1 y^2 \leq R_3^2$ is satisfied or not, where $a_0$ and $a_1$ indicate a first coordinate parameter and a second coordinate parameter, respectively, and R$_3$ indicates a third curvature radius parameter. In some embodiments, there are examples where $a_0$ is equal to $a_1$, meaning that the third partial area 330 is a circle. In other embodiments, there are examples where $a_0$ is not equal to $a_1$, meaning that the third partial area 330 is an eclipse.

When the determination result is false is step S230, a third compensation gain for the target pixel P is assigned to be zero. When the determination result is true is step S230, the method proceeds to step S235. In step S235, the lens shading correction unit 120 depends on the position of the target pixel P with respect to the optical center OC, and uses the third compensation function defined by the third curvature radius to determine the third compensation gain for the target P. Further illustration is as follows. The third compensation function can be expressed as an equation (3) below:

$$\text{Com\_Gain}_3 = \text{Gain}_3 \times (|\text{SquarePos} - R_3^2|)^{N_3} \quad \text{eq. (3)}$$

where Com_Gain$_3$ indicates the third compensation gain to be obtained, Gain$_3$ indicates a third gain parameter, and N$_3$ indicates a third polynomial degree parameter.

Figure 6A:
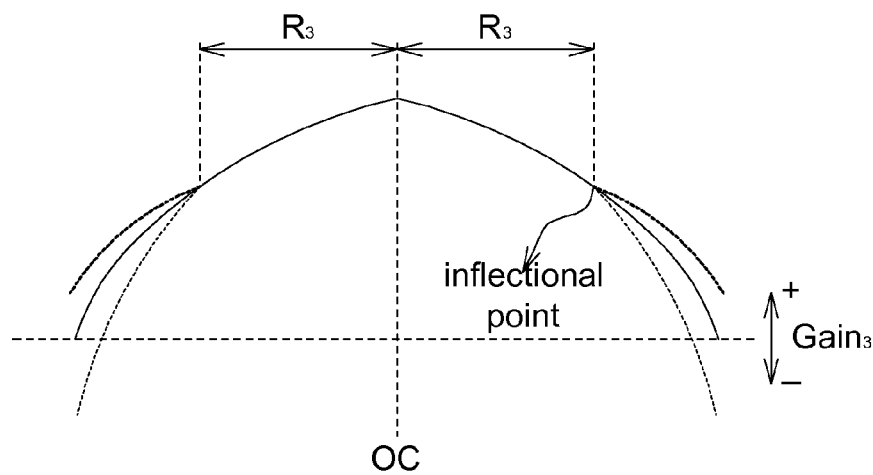
FIG. 6A is a schematic diagram showing lens shading compensation for a third partial area according to an exemplary embodiment.
Figure 6B:
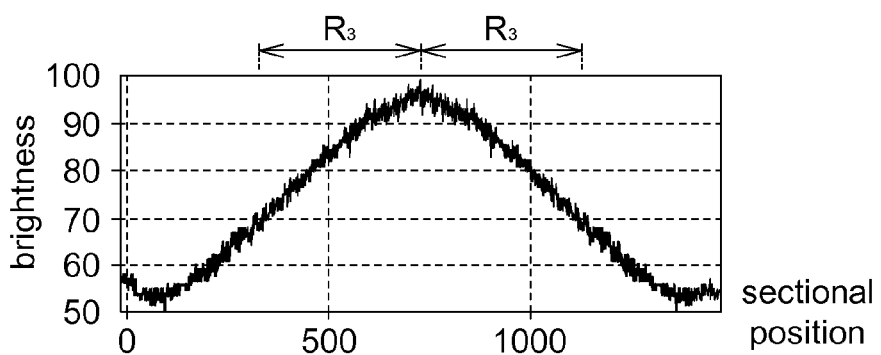
FIGS. 6B to 6D are schematic diagrams showing another example for a left-up to right-down sectional view of the image area according to an exemplary embodiment.
Figure 6C:
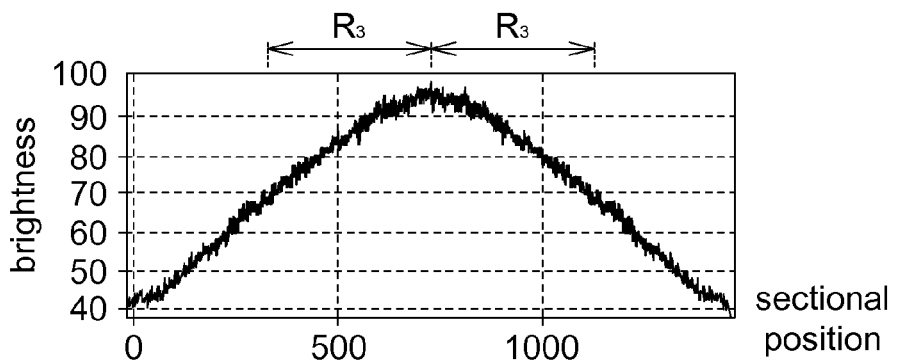
Figure 6D:
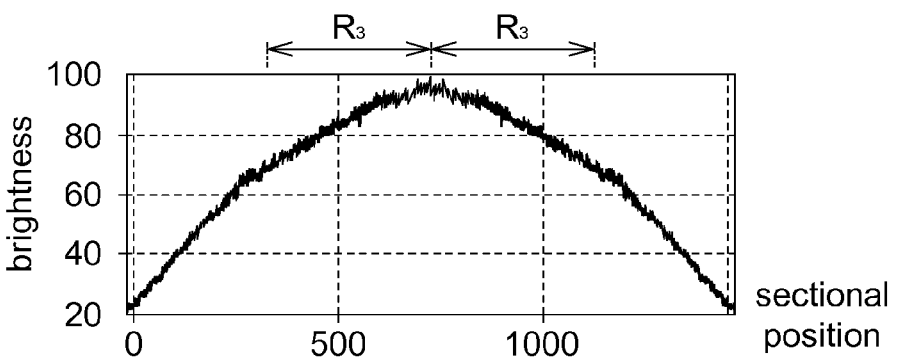

For example, outside the third partial area 330, an absolute value of the third compensation gain Com_Gain$_3$ can be preferably to set substantially zero at the border of the third partial area 330, and monotonically varies or oscillates outwardly from the border of the third partial area 330. FIG. 6A is a schematic diagram showing lens shading compensation for a third partial area according to an exemplary embodiment. In the embodiment, equation (3) is used to adjust the third gain parameter Gain$_3$, and the third compensation gain Com_Gain$_3$ is used to perform color shading correction on the pixels in the third partial area 330, so as to improve color shift. FIGS. 6B to 6D are schematic diagrams showing another example for a left-up to right-down sectional view of the image area according to an exemplary embodiment. As can be seen from FIGS. 6B to 6D, the brightness of the pixels in the third partial area 330 is adjusted in correspondence to the change of the third gain parameter Gain$_3$. But the brightness of the pixels at the borders R$_3$ of the third partial area 330 is not adjusted and kept constant such as 70 in this example.

In step S240, the lens shading correction unit 120 depends on the position of the target pixel P with respect to the optical center OC, and uses a fourth compensation function to determine the fourth compensation gain for the target P. Further illustration is as follows. The fourth compensation function can be expressed as an equation (4) below:

$$\text{Comp\_Gain}_4 = \text{Gain}_4 \times \text{SquarePos} \quad \text{eq. (4)}$$

where Com_Gain$_4$ indicates the fourth compensation gain, Gain$_4$ indicates a fourth gain parameter, x and y indicate a first coordinate and a second coordinate of the target pixel P, Comp_Gain$_4$=Gain$_4$×SquarePos, $a_0$ and $a_1$ indicate a first coordinate parameter and a second coordinate parameter.

Figure 7A:
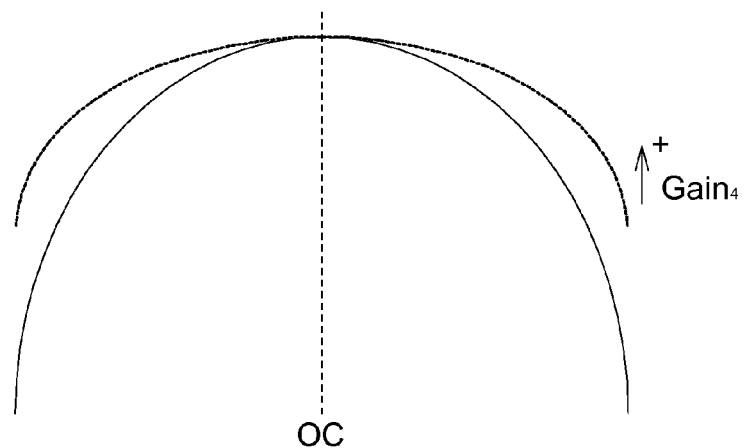
FIG. 7A is a schematic diagram showing lens shading compensation according to an exemplary embodiment.
Figure 7B:
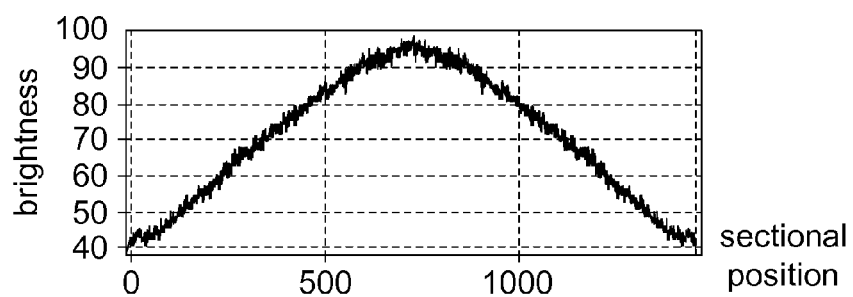
FIGS. 7B to 7C are schematic diagrams showing another example for a left-up to right-down sectional view of the image area according to an exemplary embodiment.
Figure 7C:
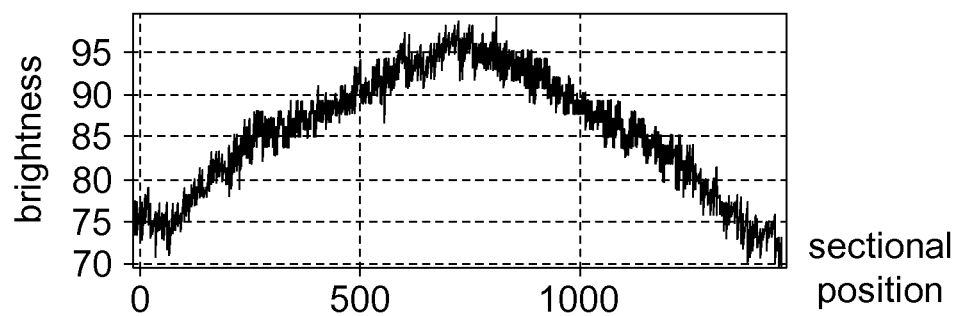

For example, an absolute value of the forth compensation gain Com_Gain$_4$ can be preferably arranged substantially zero at the optical center from which it monotonically increases or oscillates outwardly. FIG. 7A is a schematic diagram showing lens shading compensation according to an exemplary embodiment. In the embodiment, equation (4) is used to adjust the fourth gain parameter Gain$_4$, and the fourth compensation gain Com_Gain$_4$ is used to perform lens shading correction on the pixels in the image area 300, so as to improve color shift. FIGS. 7B to 7C are schematic diagrams showing another example for a left-up to right-down sectional view of the image area according to an exemplary embodiment.

In step S250, the lens shading correction unit 120 determines a mixed compensation value according to the first to the fourth compensation gains Com_Gain$_1$ to Com_Gain$_4$, so as to compensate the target pixel P. In an example, the mixed compensation value is substantially equal to the sum of the first to the fourth compensation gains Com_Gain$_1$ to Com_Gain$_4$ multiplied by a raw pixel vale of the target pixel P. Then, the target pixel P, after being compensated by using the mixed compensation value, has a pixel value which is equal to the sum of its raw pixel data and the mixed compensation value.

In some embodiments, according to design requirements and difference between practical color shading curves, the partial lens shading compensation method of FIG. 2 can be used in applications where the partial areas are of different numbers and/or different shapes while the compensation functions are of different expressions, so as to compensate pixels appropriately. Moreover, there are practicable embodiments of the disclosure where an image area is divided into a number of partial areas each being assigned a corresponding compensation function, and which compensation function will be used to compensate a pixel is determined from the position of the pixel. Furthermore, there are practicable embodiments of the disclosure where compensation functions are of different appropriate expressions to meet design requirements, and used to compensate pixels at appropriate location (e.g. inside or outside the partial areas), so as to correct the difference among different color shading curves.

According to another aspect of the present disclosure, a partial lens shading compensation method is provided. The partial lens shading compensation method includes a number of steps. An image area is divided, from the inside towards the outside of the image area, into a number of partial areas. Each of the partial areas is a circle or an ellipse, centered on an optical center of the image area. The borders of the partial areas can be defined by different curvature radii, and the curvature radii are used to define different compensation functions. Next, for each of the partial areas, a target pixel is identified as being located inside or outside of that partial area. According to the identification result, a corresponding compensation gain of that partial area for the target pixel is determined. For example but not-limitedly, determining the corresponding compensation gain of that partial area for the target pixel is performed only when the target pixel is located at the inside or outside of the partial area. In the course of determining the compensation gain, determining the compensation gain of the partial area can be based on the position of the target pixel with reference to the optical center and the corresponding curvature radius of the partial area, such as using the compensation function defined by the curvature radius. Next, another compensation gain can be determined according to the position of the target pixel with reference to the optical center. Then, according to the compensation gains, a mixed compensation value is determined and used to compensate the target pixel.

According to the disclosed embodiments of the image processing apparatus and the partial lens shading compensation method, an image area is divided into a number of partial areas, and different partial areas are compensated by adjusting original gain parameters and using different compensation gains for lens shading effect. In this way, the disclosure can be used for lens shading correction and improve color shift. Besides, as compared with a conventional lens shading compensation approach to using a quadratic function where a large number of compensation coefficients are required and are hard to be adjusted, the disclosure provides an image processing apparatus and a partial lens shading compensation method where inflectional points are used for lens shading compensation. In this way, the disclosure has a reduced computation complexity and memory requirement, and is easy to be integrated into various image processing platforms.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A partial lens shading compensation method, comprising:
    dividing, from the inside towards the outside of an image area, the image area into a plurality of partial areas, the partial areas being centered on an optical center of the image area, the partial areas including a first partial area, a second partial area, and a third partial area;
    determining, when a target pixel is identified as being located in the first partial area, a first compensation gain according to the position of the target pixel with reference to the optical center;
    determining, when the target pixel is identified as being located in the second partial area, a second compensation gain according to the position of the target pixel with reference to the optical center;
    determining, when the target pixel is identified as being located in the third partial area, a third compensation gain according to the position of the target pixel with reference to the optical center;
    determining a fourth compensation gain according to the position of the target pixel with reference to the optical center; and
    determining a mixed compensation value according to the sum of the first compensation gain, the second compensation gain, the third compensation gain, and the fourth compensation gain, so as to compensate the target pixel;
    wherein within the first partial area, an absolute value of the first compensation gain monotonically varies or oscillates toward the border of the first partial area at which it becomes zero.

2. The partial lens shading compensation method according to claim 1, wherein the partial areas are a plurality of concentric circles or concentric ellipses.

3. The partial lens shading compensation method according to claim 1, wherein in the steps of determining the first to fourth compensation gains, the first to the fourth compensation gains compensation gains are determined according to $SquarePos = a_0 x^2 + a_1 y^2$, where $a_0$ and $a_1$ indicate a first coordinate parameter and a second coordinate parameter, respectively, and x and y indicate a first coordinate and a second coordinate of the target pixel, respectively.

4. The partial lens shading compensation method according to claim 1, wherein the borders of the first partial area, the second partial area, and the third partial area are defined by a first curvature radius, a second curvature radius, and a third curvature radius, respectively; wherein in the steps of determining the first to the third compensation gains according to the position of the target pixel with reference to the optical center, the first to the third compensation gains are determined further according to the first to the third curvature radii, respectively.

5. The partial lens shading compensation method according to claim 1, wherein the first compensation gain is determined according to a first compensation function, and the first compensation function is expressed as $Com\_Gain_1 = Gain_1 \times (|SquarePos - R_1^2|)^{N_1}$ where $Com\_Gain_1$ indicates the first compensation gain, $Gain_1$ indicates a first gain parameter, $SquarePos = a_0 x^2 + a_1 y^2$, $a_0$ and $a_1$ indicate a first coordinate parameter and a second coordinate parameter, respectively, x and y indicate a first coordinate and a second coordinate of the target pixel, respectively, $R_1$ indicates a first curvature radius parameter, and $N_1$ indicates a first polynomial degree parameter.

6. The partial lens shading compensation method according to claim 1, wherein within the second partial area, an absolute value of the second compensation gain monotonically varies or oscillates toward the border of the second partial area at which it becomes substantially zero.

7. The partial lens shading compensation method according to claim 6, wherein the second compensation gain is determined according to a second compensation function, and the second compensation function is expressed as $Com\_Gain_2 = Gain_2 \times (|SquarePos - R_2^2|)^{N_2} | Factor \times SquarePos$ where $Com\_Gain_2$ indicates the second compensation gain, $Gain_2$ indicates a second gain parameter, $SquarePos = a_0 x^2 + a_1 y^2$, $a_0$ and $a_1$ indicate a first coordinate parameter and a second coordinate parameter, x and y indicate a first coordinate and a second coordinate of the target pixel, respectively, $R_2$ indicates a second curvature radius parameter, and $N_2$ indicates a second polynomial degree parameter.

8. The partial lens shading compensation method according to claim 1, wherein outside the third partial area, an absolute value of the third compensation gain is substantially zero at the border of the third partial area from which it monotonically varies or oscillates outwardly.

9. The partial lens shading compensation method according to claim 8, wherein the third compensation gain is determined according to a third compensation function, and the third compensation function is expressed as $Com\_Gain_3 = Gain_3 \times (|SquarePos - R_3^2|)^{N_3}$ where $Com\_Gain_3$ indicates the third compensation gain, $Gain_3$ indicates a third gain parameter, $SquarePos = a_0 x^2 + a_1 y^2$, $a_0$ and $a_1$ indicate a first coordinate parameter and a second coordinate parameter, respectively, x and y indicate a first coordinate and a second coordinate of the target pixel, $R_3$ indicates a third curvature radius parameter, and $N_3$ indicates a third polynomial degree parameter.

10. The partial lens shading compensation method according to claim 1, wherein an absolute value of the forth compensation gain is substantially zero, at the optical center from which it monotonically increases or oscillates outwardly.

11. The partial lens shading compensation method according to claim 10, wherein the fourth compensation gain is determined according to a fourth compensation function, and the fourth compensation function is expressed as $Comp\_Gain_4 = Gain_4 \times SquarePos$ where $Com\_Gain_4$ indicates the fourth compensation gain, $Gain_4$ indicates a fourth gain parameter, $Comp\_Gain_4 = Gain_4 \times SquarePos$, $a_0$ and $a_1$ indicate a first coordinate parameter and a second coordinate parameter, x and y indicate a first coordinate and a second coordinate of the target pixel.

12. The partial lens shading compensation method according to claim 1, wherein the mixed compensation value is substantially equal to the sum of the first to the fourth compensation gains multiplied by a raw pixel value of the target pixel.

13. The partial lens shading compensation method according to claim 1, wherein the target pixel, after being compensated by the mixed compensation value, has a pixel value which is equal to the sum of a raw pixel value of the target pixel and the mixed compensation value.

14. The partial lens shading compensation method according to claim 1, wherein the first partial area is smaller than the second partial area and the third partial area.

15. The partial lens shading compensation method according to claim 1, further comprising:
   obtaining a first curvature radius, a second curvature radius, and a third curvature radius, according to the difference among different color shading curves of a corresponding lens; and
   obtaining, according to the first to the third curvature radii, a first compensation function, a second compensation function, and a third compensation function so as to correct the difference among different color shading curves;

wherein in the steps of determining the first to the third compensation gains according to the position of the target pixel with reference to the optical center, the first to the third compensation gains are obtained by using the first to the third compensation functions.

16. The partial lens shading compensation method according to claim 15, wherein the first to the third compensation functions are polynomial equations, and the polynomial equations have a plurality of inflectional points located at the borders of the first to the third partial areas.

17. A partial lens shading compensation method, comprising:
   (i) dividing, from the inside towards the outside of an image area, the image area into a plurality of partial areas, the partial areas being centered on an optical center of the image area;
   (ii) identifying, for each of the partial areas, a target pixel as being located inside or outside of that partial area, and determining, according to the identification result, a corresponding compensation gain of that partial area for the target pixel from the position of the target pixel with reference to the optical center;
   (iii) determining another compensation gain for the target pixel according to the position of the target pixel with reference to the optical center; and
   (iv) determining a mixed compensation value according to the sum of the compensation gains obtained in step (ii) and the another compensation gain obtained in step (iii), so as to compensate the target pixel;
   wherein an absolute value of at least one of the compensation gains is zero at the border of the corresponding partial area.

18. The partial lens shading compensation method according to claim 17, wherein the partial areas are corresponding to a plurality of compensation functions, respectively, and a corresponding compensation function is used in step (ii) to determine the corresponding compensation gain of that partial area for the target pixel.

19. The partial lens shading compensation method according to claim 18, wherein the borders of the partial areas are defined by a plurality of curvature radii, respectively, and each of the compensation functions is defined by the corresponding curvature radius of the partial area.

20. The partial lens shading compensation method according to claim 17, wherein the another compensation gain is substantially zero at the optical center.

* * * * *